(12) United States Patent
Phillips et al.

(10) Patent No.: US 6,910,159 B2
(45) Date of Patent: Jun. 21, 2005

(54) SYSTEM AND METHOD FOR GATHERING AND AUTOMATICALLY PROCESSING USER AND DEBUG DATA FOR MOBILE DEVICES

(75) Inventors: Marc B. Phillips, Seattle, WA (US); John D. Doggett, Seattle, WA (US); Hai Cui, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 535 days.

(21) Appl. No.: 10/137,860

(22) Filed: May 1, 2002

(65) Prior Publication Data

US 2003/0159088 A1 Aug. 21, 2003

Related U.S. Application Data

(60) Provisional application No. 60/359,092, filed on Feb. 20, 2002.

(51) Int. Cl.[7] .................................................. G06F 11/00
(52) U.S. Cl. ............................................ 714/38; 714/39
(58) Field of Search ........................ 714/38, 39, 46–47; 455/67.11, 418–419, 423, 425; 379/1.01, 9.04, 15.05

(56) References Cited

U.S. PATENT DOCUMENTS

| | | | | |
|---|---|---|---|---|
| 5,418,837 A | * | 5/1995 | Johansson et al. | 455/558 |
| 5,524,135 A | * | 6/1996 | Mizikovsky et al. | 455/419 |
| 5,696,566 A | * | 12/1997 | Kim et al. | 349/39 |
| 5,706,333 A | * | 1/1998 | Grenning et al. | 455/423 |
| 5,805,666 A | * | 9/1998 | Ishizuka et al. | 379/1.01 |
| 5,845,194 A | * | 12/1998 | Seki et al. | 455/67.11 |
| 5,850,562 A | | 12/1998 | Crump et al. | 395/800 |
| 2001/0049263 A1 | * | 12/2001 | Zhang | 455/67.1 |
| 2003/0055666 A1 | * | 3/2003 | Roddy et al. | 705/1 |

OTHER PUBLICATIONS

C. Pils et al., "Debugging of Mobile Agents in Wireless Communication Systems", Ninth International Conference on Computer Communications and Networks, IEEE, Oct. 16–18, 2000, pp. 649–652.

B. Branson et al., "Wireless Devices: Handling Power Efficiency and Debugging", Circuit Cellar, Issue 124, Nov. 2000, pp. 12–19.

D. Kranzlmuller et al., "Ubiquitous Parallel Program Observation and Analysis with DEWIZ", International Conference on Architecture of Computing Systems, Trends in Network and Pervasive Computing, Apr. 8–12, 2002, pp. 197–202

* cited by examiner

*Primary Examiner*—Dieu-Minh Le
(74) *Attorney, Agent, or Firm*—Merchant & Gould P.C.; Joshua W. Korver

(57) ABSTRACT

A system and method for tracking user patterns, getting debug information from retail devices in use, and gathering data automatically into a central location where it is processed automatically. Information pertaining to the state of the system at the time a failure occurred on a mobile device is accessible by a developer in a disconnected mode. In addition, usage patterns are ascertainable from the data gathered.

5 Claims, 10 Drawing Sheets

SYSTEM AND METHOD FOR GATHERING AND AUTOMATICALLY PROCESSING USER AND DEBUG DATA FOR MOBILE DEVICES

RELATED APPLICATIONS

This application claims the benefit under 35 U.S.C. §119 (e) of U.S. provisional application No. 60/359,092, filed Feb. 20, 2002.

BACKGROUND OF THE INVENTION

The iterative process of correcting errors associated with computer programs is an important part of delivering a product that meets customer expectations. Debugging platforms and other development kits have been created to assist in debugging software for a variety of devices. These debugging platforms are used prior to shipping a product in an attempt to remove the potential for errors before the product reaches the customer. However, most products that have software components are not delivered error free. For example, a mobile device, such as a pocket personal computer, will have unexpected errors that occur due to the changeable nature of it's operating environment. Any number of computer programs of varying level of complexity may be loaded on a mobile device at any one time, and possibly experience any number of errors.

One limitation common to debugging platforms is that they are only able to examine and recognize errors occurring in a product prior to delivery of the product to a customer. Errors that occur in a handheld after it is shipped to the public typically go unreported without a substantial level of proactive involvement by the user. Even if reported, a developer is unable to examine the processes that actually occurred during the error since the handheld was not coupled to a debugging platform at the time.

SUMMARY OF THE INVENTION

The present invention allows for tracking real user patterns, getting debug information from retail devices in real world use, and gathering data automatically into a central location where it is processed automatically with little to no user intervention. The present invention allows information pertaining to the state of the system at the time a failure occurred on retail devices to be accessed by a developer in a disconnected mode. As many bugs do not occur in debug environments (and real users cannot carry the necessary debug equipment around with them), the present invention enables the ability to catch these bugs and fix them based on the information gathered. In an alternative embodiment, the present invention also provides a method to find real product stability based on real usage as well. Prior art methods only allowed for time to failure during automated stress tests, which do not necessarily map to real stability numbers. Additionally, usage patterns can be ascertained from the data gathered with little to no action on the part of the user. Competitors face similar data gathering problems and would benefit from the technology to bring better products to market more quickly.

In one embodiment, the invention includes a monitoring application, a first transport application, a second transport application, a database management application, and a database interface application. In operation, the monitoring application launches at startup and attaches itself to any running process. It then runs continuously in the background on the device, generating a continuous stream of data containing details of user actions and system messages while the device is in use. When a problem is detected, the stream is parceled as a log file, details of the issue are added to that log file (e.g. system state and exception information) and a dialog is displayed to the user noting a problem has occurred. In one embodiment, when the user is forced to reset the device (or the device crashes and resets itself), a full screen dialog launches automatically requesting details from the user regarding any higher-level information about user actions that will help developers to reproduce the problem along with the system information from the log file. In this embodiment, the user cannot continue until this information is added, thus assuring the data is gathered. In another embodiment, when the user resets the device accidentally or reproduces an already known problem, there is an option to note this and the incident is not counted as a failure. If no failures occur, the stream is parceled into a log file when they reach a specified size or a certain amount of time has passed, and new log files are created.

The mobile device accumulates a series of discrete log files representing problems reported by the user or the system, or the passage of time with no interesting occurrences. The process of breaking the continuous data stream into these discrete parcels helps to manage the constraint of storage space on the device and the bandwidth limitations in moving data from the device in an unobtrusive manner. These log files are prioritized upon creation according to the nature of data they represent, in particular whether they specifically represent the presence of a bug, or rather simply the passage of time.

In one embodiment, a first transport application is provided. When the user establishes a connection between the mobile device and a PC, the log files on the device are copied to a folder on the PC and then deleted from the device. The files are deleted as they are copied to accommodate the anticipated user action of prematurely removing the device from the cradle, thereby interrupting the synchronization process. If the synchronization process is interrupted, those log files successfully copied from the device will have been deleted from the device, thus marking progress in reducing the volume of log data on the device, and increasing the volume on the PC. Furthermore, the prioritization of the log files ensures that the most important data is moved from the device first, maximizing the effectiveness of time that the device spends coupled to the PC.

In another embodiment, a second transport application is launched automatically which transports the log files to a server with a database management application that enters the details of each file (user, date, time to failure, log file path, etc.) into a central database, and deletes the files from the user's desktop machine. A developer can then go to a web page on their desktop, which displays the results in the database automatically. At this point, the developer may select to get a call stack, and the log files are automatically concatenated into one file and processed to generate a complete call stack for the failure. A description of a calling convention for the particular configuration of the mobile device may be necessary to reconstruct the call stack. The complete call stack may then be entered into a database as a bug.

DETAILED DESCRIPTION OF THE PREFERRED EMBODIMENT

Figure 1:
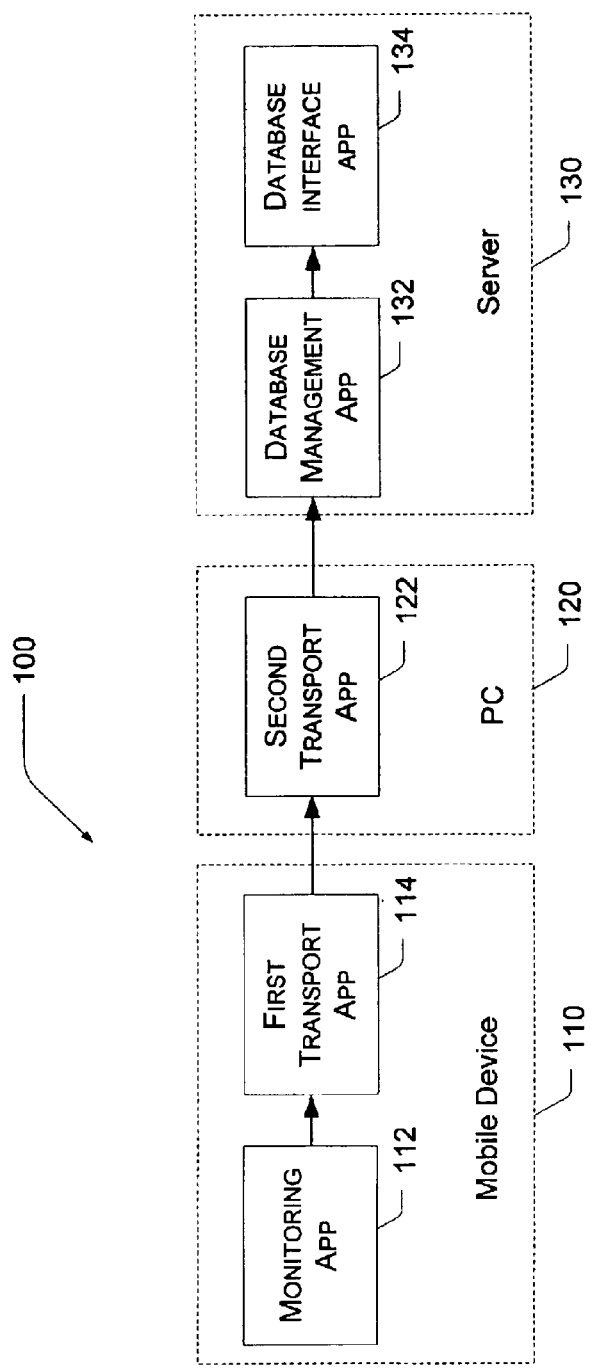
FIG. 1 is a functional block diagram illustrating one embodiment of an exemplary environment for practicing the present invention.

The present invention now will be described more fully hereinafter "with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise.

The term "connected" means a direct connection between the things that are connected, without any intermediary devices or components. However, the term "connection" may refer to device that are connected through multiple devices, such as a connection across a network. The term "coupled," means a direct connection between the things that are connected, or an indirect connection through one or more either passive or active intermediary devices or components. The meaning of "a," "an," and "the" include plural references. The meaning of "in" includes "in" and "on."

The term "mobile device" includes, but is not limited to PDAs, handheld computers, and communication devices such as cellular phones and pagers. The term "retail devices" refers to mobile devices ready for delivery or use by customers. The term "PC" refers to a personal computing device or user computer, such a laptop or desktop computer. The term "server" refers to a computer or device on a network that manages network resources or other centrally-located computing device for processing data. The term "disconnected mode" refers to functions that may be performed without requiring a standing connection to the mobile device. In other words, functions that may be performed in a disconnected mode refers to operations that do not require a connection to the mobile device at the time the operation commences.

The present invention allows for tracking real user patterns, getting debug information from retail devices in real world use, and gathering data automatically into a central location where it is processed automatically with little to no user intervention. Information pertaining to the state of the system at the time a failure occurred on retail devices is transported to a PC and then to a server. As many bugs do not occur in debug environments (and real users cannot carry the necessary debug equipment around with them), the present invention enables the ability to catch these bugs and fix them based on the information gathered. In an alternative embodiment, the present invention also provides a method to find real product stability based on real usage as well. Prior art methods only allowed for time to failure during automated stress tests, which do not necessarily map to real stability numbers. Additionally, usage patterns can be ascertained from the data gathered with little to no action on the part of the user.

Illustrative Operating Environment

FIG. 1 shows an exemplary block diagram of one embodiment of the present invention. In this embodiment, system 100 includes mobile device 110, PC 120, and server 130. The mobile device 110 includes monitoring application 112 and first transport application 114. PC 120 includes second transport application 122. Server 130 includes database management application 132 and database interface application 134.

In operation, monitoring application 112 launches at startup and attaches itself to any running process on mobile device 110 as a debugger. Monitoring application 112 monitors the system of mobile device 110 for bug messages or exceptions. Monitoring application 112 also instruments the user interface to receive user inputs to mobile device 110 in a human-readable format. In one embodiment, it may be necessary to provide access to operating system process and thread structures of the kernel in order to attach the monitoring application 112. Monitoring application 112 then runs continuously in the background on the device, generating a continuous stream of data containing details of user actions and system messages while mobile device 110 is in use.

When a connection is established between PC 120 and mobile device 110, the data is formatted and transported to PC 120 using first transport application 114. Second transport application 122 reformats and transports the data to server 130 once the PC has an established network connection. Database management application 132 then stores instances of errors and usage patterns in a database for further reference. In addition, database interface application 134 presents the data in a format that is understandable and accessible by a developer. The developer is able to examine errors that may have occurred as well as the state of mobile device 110 at the time the error occurred. The developer is also able to examine a record of user input patterns for analysis of the performance of mobile device 110.

In another embodiment, mobile device 110 forwards the data directly to server 130 or through a device other than through PC 120. For example, mobile device 110 may transport the data via a wireless network or other network directly to sever 130.

Figure 2:
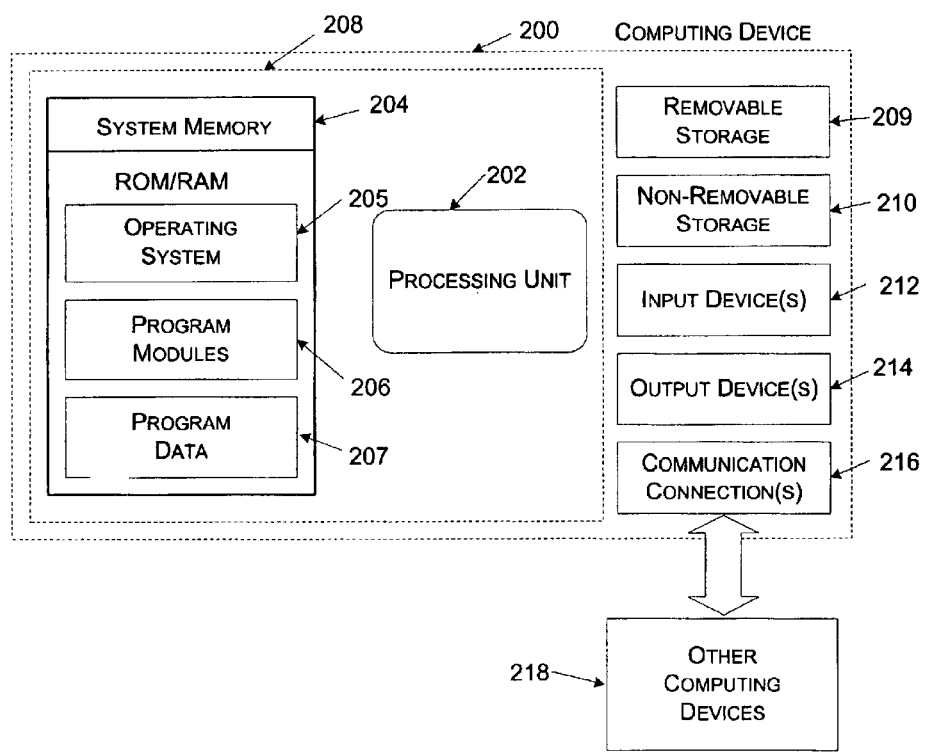
FIG. 2 illustrates an exemplary computing device that may be used in one exemplary embodiment of the present invention.

FIG. 2 shows an exemplary computing device that may be included in system 100 for implementing the invention. Computing device 200 illustrates a general operating environment that may apply to mobile device 110, PC 120, and server 130 shown in FIG. 1. In a very basic configuration, computing device 200 typically includes at least one processing unit 202 and system memory 204. Processing unit 202 includes existing physical processors, those in design, multiple processors acting together, virtual processors, and any other device or software program capable of interpreting binary executable instructions. Depending on the exact configuration and type of computing device, the system memory 204 may be volatile (such as RAM), non-volatile (such as ROM, flash memory, etc.) or some combination of the two. System memory 204 typically includes an operating system 205, one or more program modules 206, and may include program data 207. This basic configuration is illustrated in FIG. 2 by those components within dashed line 208.

When mobile device 110 shown in FIG. 1 is represented by computing device 200, monitoring application 112 and first transport application 114 are included in computing device 200 among one or more program modules 206.

When PC 120 shown in FIG. 1 is represented by computing device 200, second transport application 122 is included in computing device 200 among one or more program modules 206.

When server 130 shown in FIG. 1 is represented by computing device 200, database management application 132 and database interface application 134 are included in computing device 200 among one or more program modules 206.

Computing device 200 may also have additional features or functionality. For example, computing device 200 may also include additional data storage devices (removable and/or non-removable) such as, for example, magnetic disks, optical disks, or tape. Such additional storage is illustrated in FIG. 2 by removable storage 209 and non-removable storage 210. Computer storage media may include volatile and nonvolatile, removable and non-removable media implemented in any method or technology for storage of information, such as computer readable instructions, data structures, program modules or other data. System memory 204, removable storage 209 and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 200. Any such computer storage media may be part of computing device 200. Computing device 200 may also have input device(s) 212 such as keyboard, mouse, pen, stylus, voice input device, touch input device, etc. Output device(s) 214 such as a display, speakers, printer, etc. may also be included. All these devices are known in the art and need not be discussed at length here.

Computing device 200 may also contain communications connection(s) 216 that allow the device to communicate with other computing devices 218, such as over a network. Communications connection(s) 216 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 3:
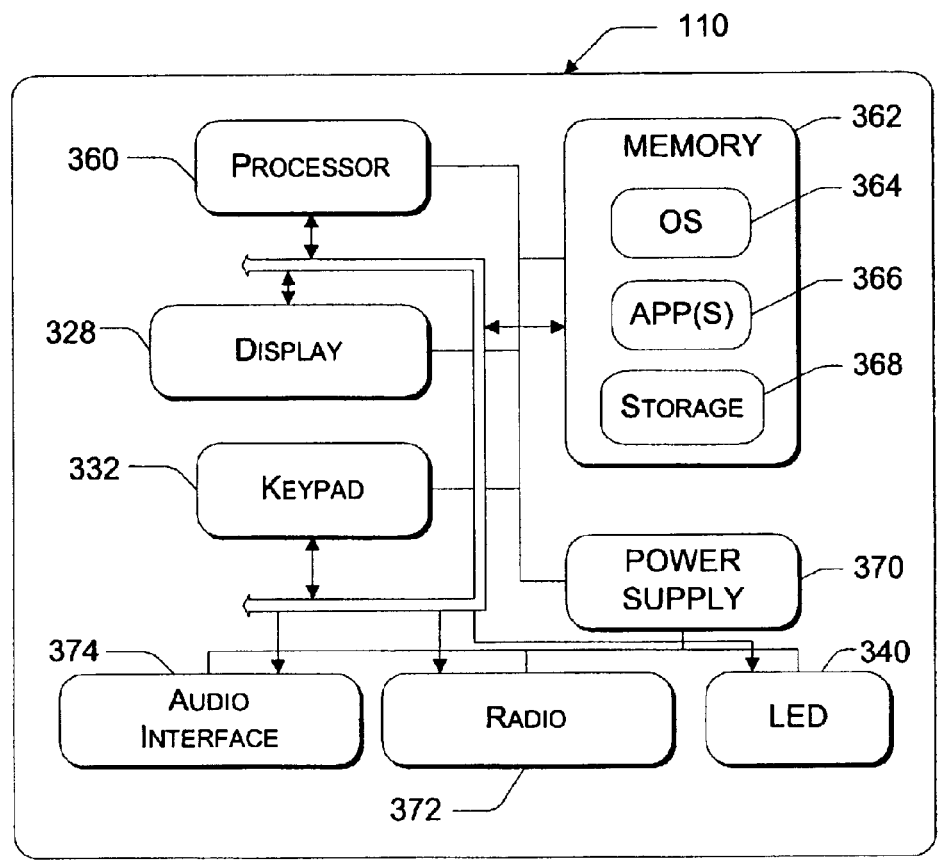
FIG. 3 illustrates an exemplary mobile device that may be used in one exemplary embodiment of the present invention.

FIG. 3 shows an alternative operating environment for a mobile device substantially for use in the present invention. In one embodiment of the present invention, mobile device 300 is integrated with a computing device, such as an integrated personal digital assistant (PDA) and wireless phone.

In this embodiment, mobile device 300 has a processor 360, a memory 362, a display 328, and a keypad 332. Memory 362 generally includes both volatile memory (e.g., RAM) and non-volatile memory (e.g., ROM, Flash Memory, or the like). Mobile device 300 includes an operating system 364, which is resident in memory 362 and executes on processor 360. Keypad 332 may be a push button numeric dialing pad (such as on a typical telephone), a multi-key keyboard (such as a conventional keyboard), or may be not be included in the mobile device in deference to a touch screen or stylus. Display 328 may be a liquid crystal display, or any other type of display commonly used in mobile computing devices. Display 328 may be touch-sensitive, and would then also act as an input device.

One or more application programs 366 are loaded into memory 362 and run on operating system 364. Examples of application programs include phone dialer programs, e-mail programs, scheduling programs, PIM (personal information management) programs, word processing programs, spreadsheet programs, Internet browser programs, and so forth. Mobile device 300 also includes non-volatile storage 368 within the memory 362. Non-volatile storage 368 may be used to store persistent information which should not be lost if mobile device 300 is powered down. The applications 366 may use and store information in storage 368, such as e-mail or other messages used by an e-mail application, contact information used by a PIM, appointment information used by a scheduling program, documents used by a word processing application, and the like. A synchronization application also resides on the mobile device and is programmed to interact with a corresponding synchronization application resident on a host computer to keep the information stored in the storage 368 synchronized with corresponding information stored at the host computer.

When mobile device 110 shown in FIG. 1 is represented by mobile device 300, monitoring application 112 and first transport application 114 are included in mobile device 300 among the one or more application programs 366.

Mobile device 300 has a power supply 370, which may be implemented as one or more batteries. Power supply 370 might further include an external power source, such as an AC adapter or a powered docking cradle that supplements or recharges the batteries.

Mobile device 300 is also shown with two types of external notification mechanisms: an LED 340 and an audio interface 374. These devices may be directly coupled to power supply 370 so that when activated, they remain on for a duration dictated by the notification mechanism even though processor 360 and other components might shut down to conserve battery power. LED 340 may be programmed to remain on indefinitely until the user takes action to indicate the powered-on status of the device. Audio interface 374 is used to provide audible signals to and receive audible signals from the user. For example, audio interface 374 may be coupled to a speaker for providing audible output and to a microphone for receiving audible input, such as to facilitate a telephone conversation.

Mobile device 300 also includes a radio 372 that performs the function of transmitting and receiving radio frequency communications. Radio 372 facilitates wireless connectivity between the mobile device 300 and the outside world, via a communications carrier or service provider. Transmissions to and from the radio 372 are conducted under control of the operating system 364. In other words, communications received by the radio 372 may be disseminated to application programs 366 via the operating system 364, and vice versa.

The radio 372 allows the mobile device 300 to communicate with other computing devices, such as over a network. The radio 372 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 4:
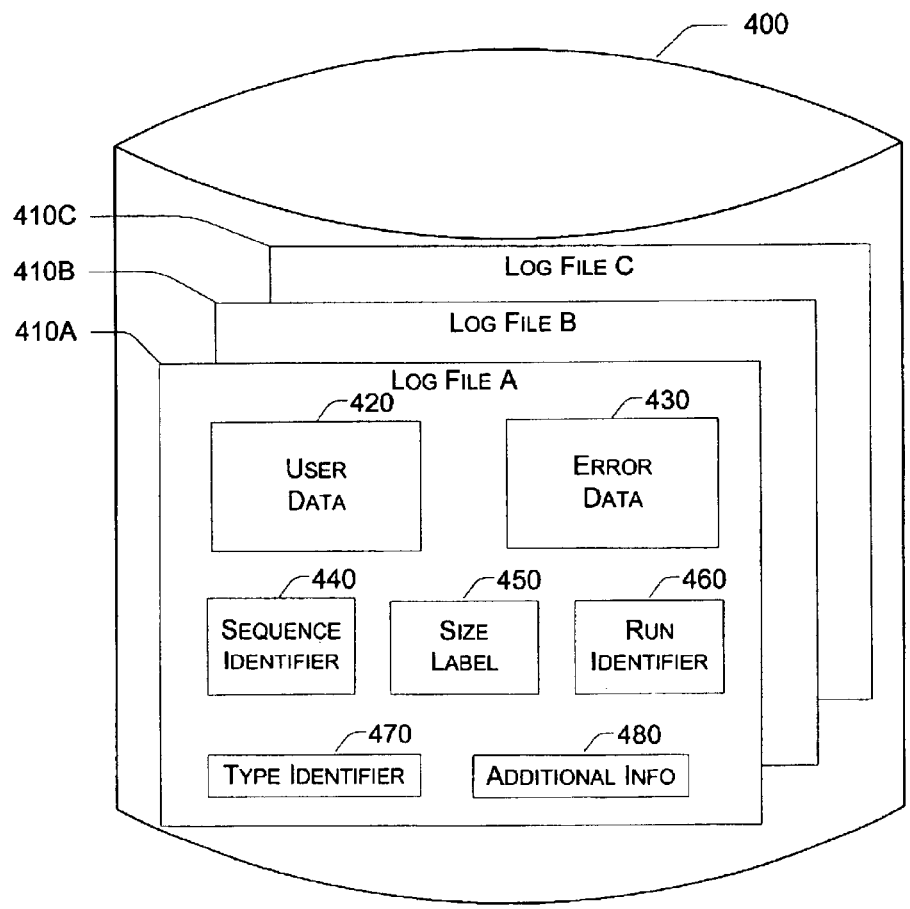
FIG. 4 is a graphical representation of exemplary log files generated in accordance with the present invention.

FIG. 4 is a graphical representation of exemplary log files generated in accordance with the present invention. Memory 400 includes log files 410A–410C. Each log file may include user data 420, error data 430, sequence identifier 440, size label 450, run identifier 460, type identifier 470, and additional info 480.

User data 420 corresponds to the information pertaining to user input to the mobile device 110 shown in FIG. 1. User data 420 includes keystroke entries, stylus entries, button press entries, keyed entries, and the like. User data 420 also includes information about the program corresponding to the entries made by the user. For example, a user may open a web browser application, perform a search using the web browser, receive a web page corresponding to the search parameters, and then shut down the web browser. The contents of user data 420 corresponding to such actions might include information on how the web browser was opened (e.g., a double-click or through the start menu), the search parameters that were entered, the web page that was received, and the length in time that the web browser was in use. Including user data 420 in the log file allows usage patterns to be ascertained from the data gathered with little to no action on the part of the user.

Error data 430 includes information for recreating the state of the mobile device 110 shown in FIG. 1 at the time the error occurred. The information included in error data 430 is sufficient to recreate the call stack that was present on a mobile device at the time the error occurred. The information also allows for a determination of the "time to failure". The "time to failure" refers to the length of time the user was using the mobile device and the application located on the mobile device prior to the occurrence of the error. In one embodiment, the monitoring application, in response to an error condition, gather a sufficient amount of information from areas such as system registers, system memory, the active program's heap, and the like to recreate the call stack as it existed when the error occurred. The error related data gathered may then be added to error data 430.

In one embodiment, the information provided in both user data 420 and error data 430 is developer level information. In other words, the information refers to code usage and code failure rates that are considered important to a developer for monitoring the usage of the mobile device.

Sequence identifier 440 is a time stamp that gives an interval of time that is associated with each log file. In one embodiment, sequence identifier 440 includes the calendar day, month, and year as well as time of day the interval occurred. In another embodiment, sequence identifier 440 acts as a counter, counting incrementally from an initial time for that particular mobile device. Sequence identifier 440 assists in parceling the log files into discrete files after a certain amount of time has lapsed as described below in connection with FIG. 5. Sequence identifier 440 also allows each log file to be uniquely identified by their time interval.

Size label 450 includes an indicator of the size of each log file. The size label 450 assist in determining when each file 410A–410C has reach a certain size before starting a new log file. Holding each log file 410A–410C to a discrete size assists in ensuring that each log file is transported with a minimal loss of data. The process of breaking the continuous data stream into discrete parcels also helps to manage the constraint of storage space on the mobile device and the bandwidth limitations in moving data from the mobile device in an unobtrusive manner Run identifier 460 uniquely identifies the log files 410A–410C created between the resets of the mobile device. Each time a reset occurs for the mobile device, the monitoring program generates a new run identifier 460 to be associated with each log file created until another reset occurs. Usage patterns and error data may be tracked for the interval between resets by examining log files with the same run identifier 460.

Type identifier 470 identifies the type of data contained within each log file 410A–410C. For example, when a log file contains error data, the log file has a different type identifier 470 than when the log file contains data corresponding to the simple passage of time. Type identifier 470 assists in prioritizing each log file for transport from the mobile device as described below in connection with FIG. 8. When each log file is parceled, each log file is automatically prioritized according to its type identifier 470.

Additional info 480 represents additional information regarding a mobile device that may be included within each log file 410A–410C. In one embodiment, product and/or platform information is included within each log file 410A–410C. Such information may include the size of the RAM present on the mobile device, the mobile device build ID, the version of software present on the mobile device, OEM platform ID, and other additional information.

Figure 5:
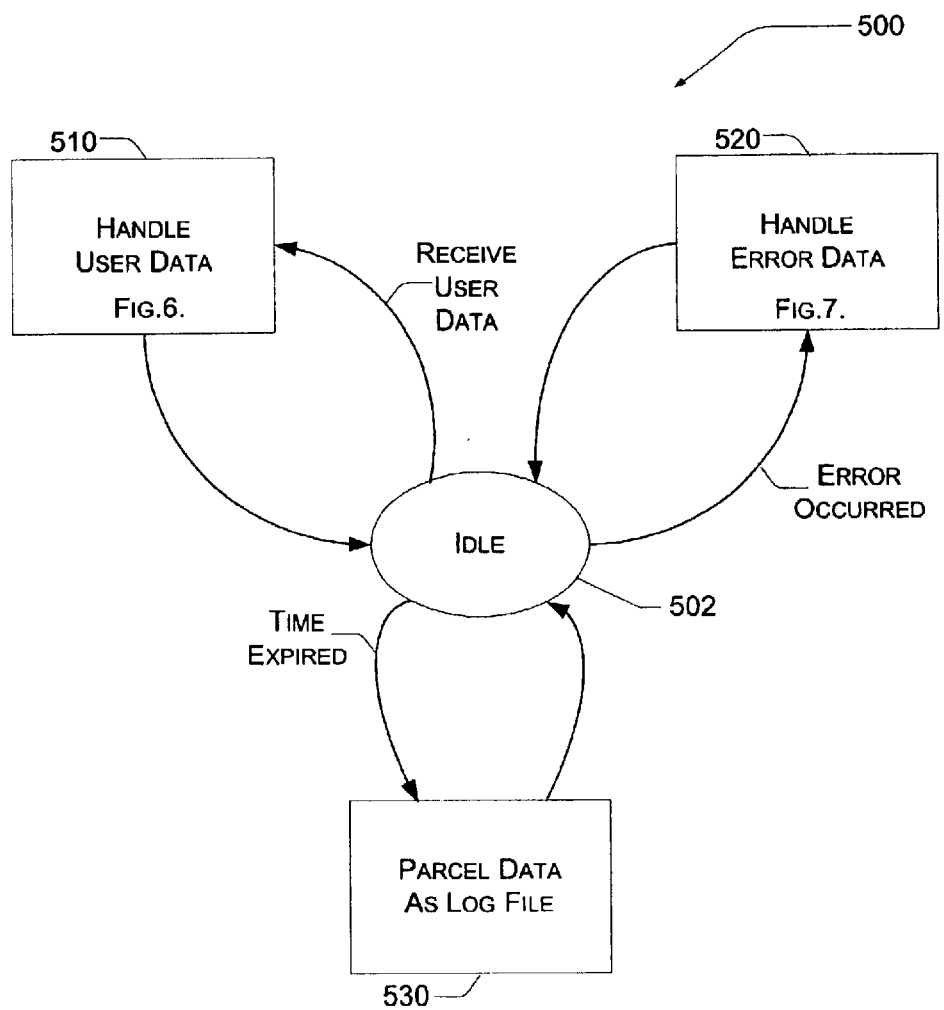
FIG. 5 illustrates an exemplary state table for handling data with the monitoring application of the mobile device in accordance with the present invention.

FIG. 5 illustrates an exemplary state table for handling data with the monitoring application of the mobile device in accordance with the present invention. Finite state machine 500 includes four states for monitoring application depending on four separate events.

Initially, the monitoring application of a mobile device is at idle 502, indicating that there is no error data or user data currently being generated by the mobile device. In another embodiment, the monitoring application is not idle, but instead is constantly looped to check for new processes that have been launched on the mobile device.

The monitoring application moves to a state to handle user data 510 when user data is received by the monitoring application. The process of the monitoring application for handling user data is described in greater detail in connection with FIG. 6. Once the user data has been handled by the monitoring application, the monitoring application moves back to idle 502.

When an error occurs, the monitoring application moves to a state to handle error data 520. The process of the monitoring application for handling error data is described in greater detail in connection with FIG. 7. Once the error data has been handled by the monitoring application, the monitoring application moves back to idle 502.

Alternatively, while the monitoring application is at idle 502, a determination may occur that a predetermined amount of time has lapsed. When time has expired, the monitoring application moves to a state where the data currently accumulated is parceled as a log file 530. In one embodiment, sequence identifier 440 shown in FIG. 4 is examined to determine when the predetermined amount o time has lapsed. For example, it may be desired to have each log file represent no more than 4 hours of accumulated data. The monitoring application may examine sequence identifier 440 to determine when the 4 hours has lapsed and then parcel the accumulated data to a log file. Holding each log file to a discrete size or a discrete amount of time assists in transporting the log files from the mobile device, as described above.

Figure 6:
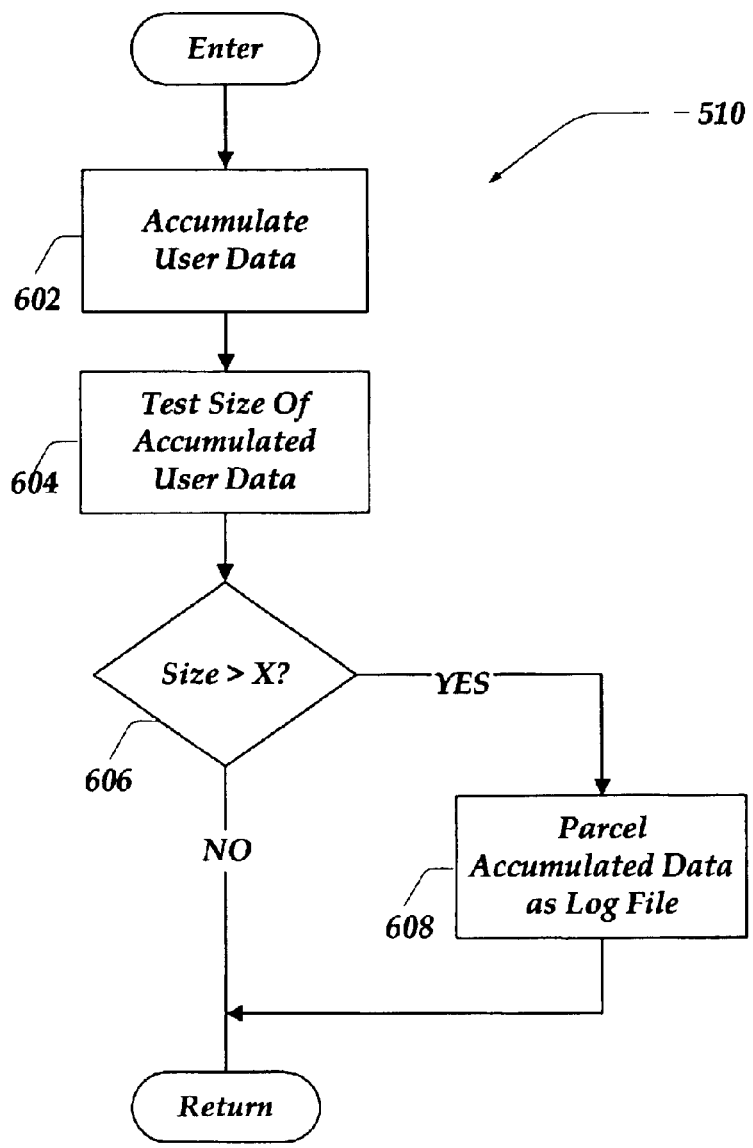
FIG. 6 is a logical flow diagram illustrating an overview of a user data handling process in accordance with the present invention.

FIG. 6 is a logical flow diagram illustrating an overview of a user data handling process in accordance with the present invention. The process 510 enters at an enter block after user data has been received by monitoring application 112 illustrated in FIG. 1. Processing continues at block 602.

At block 602, the user data is accumulated in anticipation of an event that causes the data to be parceled as a log file. While the data is being accumulated, processing proceeds to block 604.

At block 604, the size of the accumulated user data is tested. In one embodiment, the size of the accumulated user data is represented by a number of bits. In another embodiment, the size of the accumulated user data is determined by examining size label 450 shown in FIG. 4. Size label 450 is associated with the user data once it is parceled as a log file. Once the size of the accumulated user data is determined, processing continues at decision block 606.

At decision block 606, a determination is made whether the size of the accumulated user data has exceeded a predetermined threshold "X". The predetermined threshold "X" corresponds to a size limit desired for each log file (e.g., 100 Kb) If the size of the accumulated user data does not exceed the predetermined threshold "X", processing continues to a return block where the monitoring application returns to an idle state.

If, however, the size of the accumulated user data exceeds the predetermined threshold "X", processing continues to block 608 where the accumulated user data is parceled as a log file. After the accumulated data has been parceled as a log file, processing continues to a return block where the monitoring application returns to an idle state.

Figure 7:
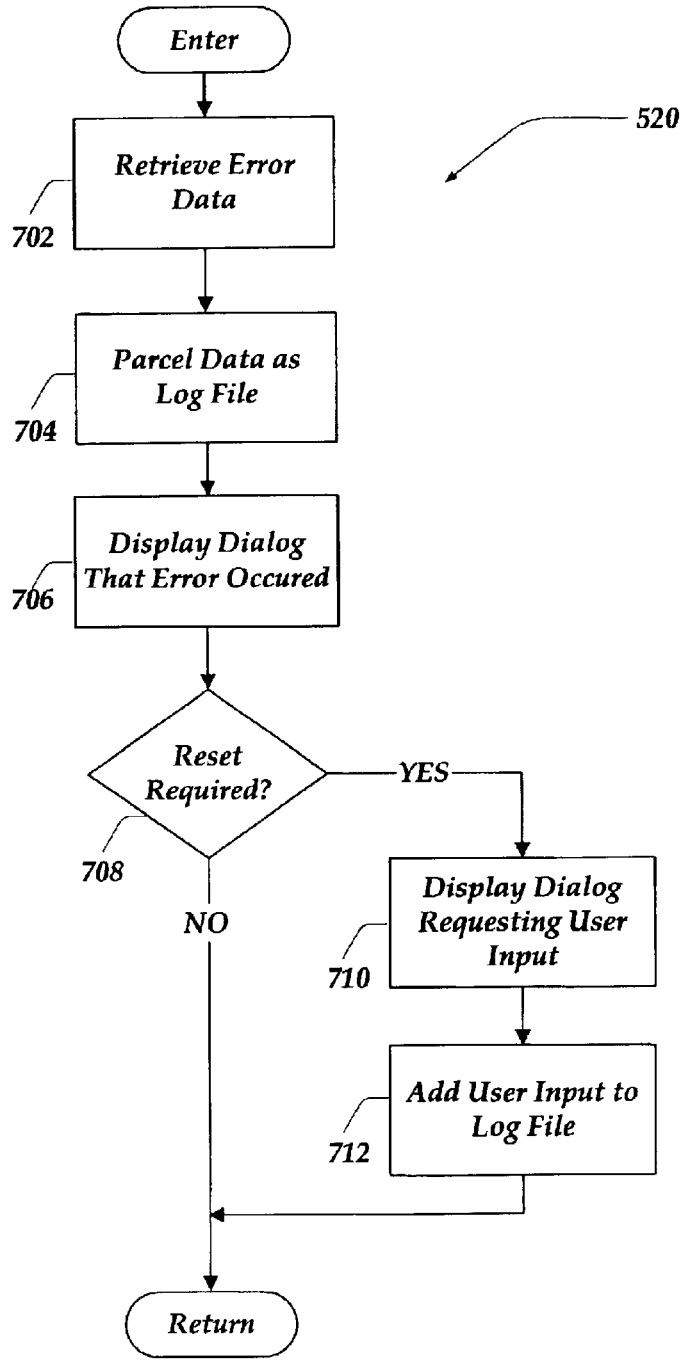
FIG. 7 is a logical flow diagram illustrating an overview of an error data handling process in accordance with the present invention.

FIG. 7 is a logical flow diagram illustrating an overview of an error data handling process in accordance with the present invention. The process 520 enters at an enter block after an error is detected by monitoring application 112 shown in FIG. 1. Processing continues at block 702.

At block 702, the monitoring application retrieves error data relating to the error that occurred, as described in the discussion of error data 430 in connection with FIG. 4. Once the error data is retrieved, processing proceeds to block 704.

At block 704, the error data and any accumulated user data is parceled as a log file. The type identifier 470 (see FIG. 4) of the log file is generated to indicate that the log file contains error data. Once the data is parceled as a log file, processing continues at block 706.

At block 706, a dialog screen or window is generated indicating that an error has occurred. In one embodiment, the dialogue screen contains detailed information regarding the error. The detail information may include, the application where the error occurred, the type of error, debugging information, and an Internet address where the user may access further information. In one embodiment, the dialog screen may give the Internet address for the web page that recreates the call stack of the mobile device when the error occurred as described below in connection with FIG. 9. While the dialogue screen is displayed, processing advances to decision block 708.

At decision block 708, a determination is made whether a reset was required as a result of the error that occurred. Not all errors cause a reboot of the mobile device to be necessary. However, when a reboot is necessary, it may be an indication of an error considered by a developer to be a more serious type of error. If a reset of the mobile device was not required by the error that occurred, processing continues to a return block where the monitoring application returns to an idle state. If, however, a reset was necessary as a result of the error, processing continues to block 710.

At block 710, a dialog screen or window is generated requesting additional user information regarding the occurrence of the error and requirement of the reset. The dialog screen requests responses from the user regarding information about user actions that will help developers to reproduce the problem. In one embodiment, the user cannot continue until this information is added, thus assuring the data is gathered. In another embodiment, when the user resets the device accidentally or reproduces an already known problem, there is an option for the user to not include such an occurrence and the incident is not counted as a failure. In an alternative embodiment, the user also has an option to open the dialog at any time and add information regarding a particular error occurrence at any time. Once the dialog has been generated, and the user enters any necessary information, process continues at block 712.

At block 712, the information provided by the user is added to the log file corresponding to that particular error. The additional information assists developers in recreating the incident that caused the error on the mobile device. After the information is added to the log file, processing continues to a return block where the monitoring application returns to an idle state.

In an additional embodiment, a dialog user interface is provided so that the user may launch a dialog screen for entering comments that are provided to a developer. The dialog screen may be launched by the user at most intervals during the processes described in FIGS. 6 and 7. The user can launch the dialog screen from a system tray or similar application. Once the user comments have been entered onto the dialog screen, the comment is packaged together with the next subsequently parceled log file. In one embodiment, the user comments are stored until the next log file is parceled. In another embodiment, the user comments trigger the next log to be parceled for transmission such that the log file is parceled immediately, and the user comments are include within that log file.

Figure 8:
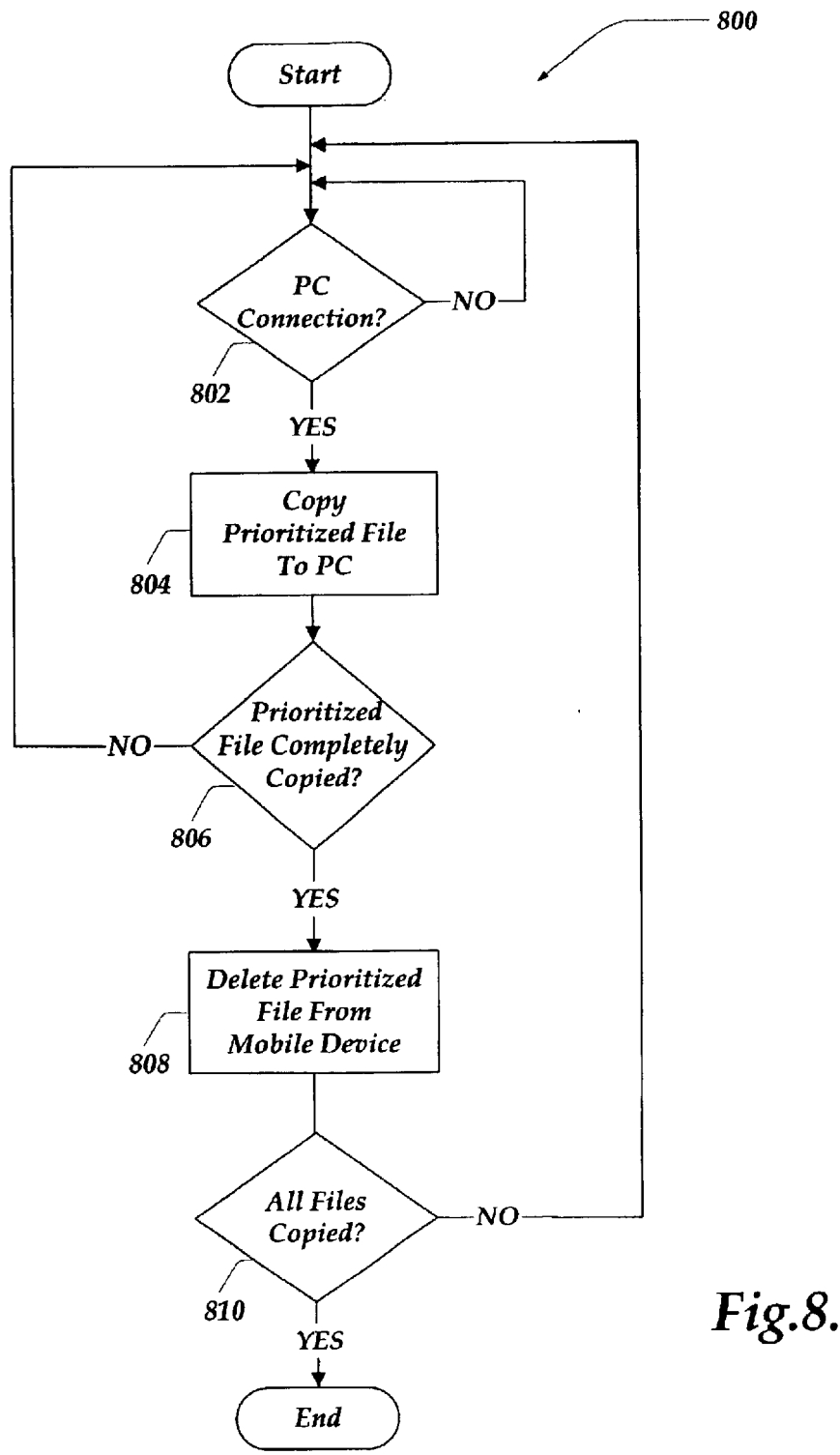
FIG. 8 is a logical flow diagram illustrating an overview of a process for transporting a log file from a mobile device to a PC in accordance with the present invention.

FIG. 8 is a logical flow diagram illustrating an overview of a process for transporting a log file from a mobile device to a PC in accordance with the present invention. The process 800 begins at a start block after at least one log file has been generated by monitoring application 112 shown in FIG. 1. Processing continues at decision block 802.

At decision block 802, first transport application 114 shown in FIG. 1, determines whether a connection is established between mobile device 110 and PC 120. In one embodiment, the connection is established via a sync cradle or sync cable commonly associated with PDAs and other personal computing devices. In another embodiment, the connection is established via a wireless network commonly associated with cellular phones or other wireless communication devices. Usually, the connection is made for another purpose than for debugging of a mobile device. For example, when a PDA is placed in sync cradle, the user associates that procedure with syncing e-mail, contacts, and other database service between a PC and a mobile device. The user data and error data contained within the log files of a mobile device is transmitted transparently to the PC from the mobile device. In other words, the user need not be concerned or even aware of the information that is passed from the mobile device to the PC. If no connection is established the process loops back to decision block 802 until a connection is established. Once a connection between the mobile device and the PC is established, processing proceeds to block 804.

At block 804, a prioritized log file is copied to the PC by the first transport application. The log files are prioritized according to type identifier 470 (see FIG. 4). By examining type identifier 470, the log files that contain error data are given priority and copied from the mobile device to the PC first. Once the prioritized log file is copied to the PC, processing advances to decision block 806.

At decision block 806, a determination is made whether the prioritized file was completely copied from the mobile device to the PC. It may occur that the connection established between the mobile device and the PC is prematurely interrupted (e.g., pulling a PDA from a sync cradle). If the connection between mobile device and the PC is prematurely interrupted while the prioritized log file is copied to the PC, the copy located on the PC is incomplete. If the copy of the prioritized log file on the PC is incomplete, process 800 loops back to block 802 without deleting the prioritized log file from the mobile device, and process 800 starts over. However, if the prioritized log file is completely copied to the PC, processing advances to block 808.

At block 808, the prioritized log file copied to the PC from the mobile device is deleted from the mobile device. The log files are deleted as they are copied so as to accommodate the anticipated user action of prematurely interrupting the connection established between the mobile device and the PC (e.g., pulling a PDA from a sync cradle). If the connection is interrupted, those log files successfully copied from the mobile device are deleted from the mobile device, while the remaining log files wait for the connection to be reestablished. Deleting the log files as they are copied assists in reducing the volume of data stored on the mobile device. After the prioritized file is deleted from the mobile device, processing proceeds to decision block 810.

At decision block 810, a determination is made whether all the log files located on the mobile device have been copied to the PC. If all the log files located on the mobile device have been copied to the PC, processing continues to an end block, where the mobile device moves on to perform other functions. However, if all the log files located on the mobile device have not been copied to the PC, then process 800 loops back to decision block 802, where process 800 restarts for subsequent log files.

Figure 9:
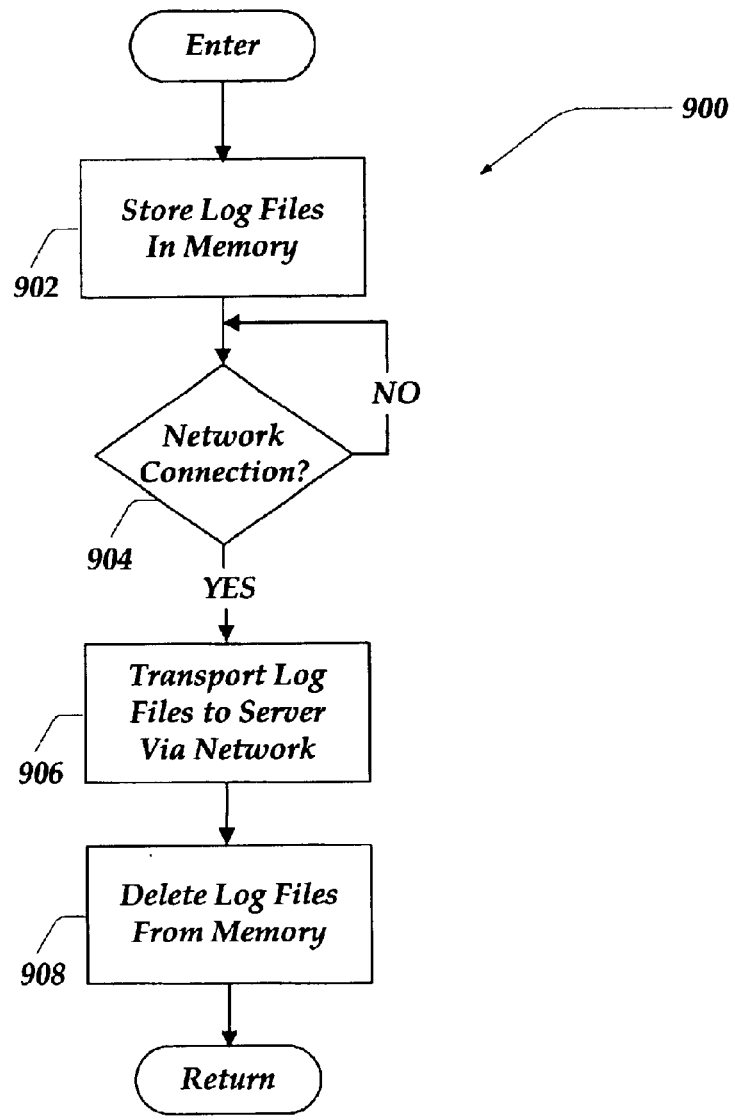
FIG. 9 is a logical flow diagram illustrating an overview a process for transporting a log file from a PC to a server in accordance with the present invention.

FIG. 9 is a logical flow diagram illustrating an overview of a process for transporting a log file from a PC to a server in accordance with the present invention. The process 900 begins at a start block after at least one log file has been copied to PC 120 from mobile device 110 shown in FIG. 1. Processing continues at block 902.

At block 902, each log files is stored in memory. In one embodiment, a folder dedicated to transporting user and error data is used to store each log file on the PC. In another embodiment, the folder or location where the user data and error data is stored is transparent to a user of the PC. Once at least one log file is stored in memory, the process continues to a decision block 904.

At decision block 904, a determination is made whether a network connection has been established to the PC. The network connection can be established through a modem, LAN, or other type of network access. If no network connection exists, process 900 loops continuously until a network connection is established. Once a network connection is established to the PC, processing moves to block 906.

At block 906, the log files stored on the PC are transported to server 130 shown in FIG. 1. The log files may be transported according to any adequate protocol (e.g., TCP/IP) for transporting data across a network. After the log files are transported to the server, processing proceeds to block 908.

At block 908, the log files that are successfully transported to the server from the PC are deleted from the memory of the PC. Deleting the files once they have been transported to the server conserves memory space on the PC. After the log files successfully transported to the server are deleted from the PC, processing moves to an end block where the PC moves on to perform other functions.

Figure 10:
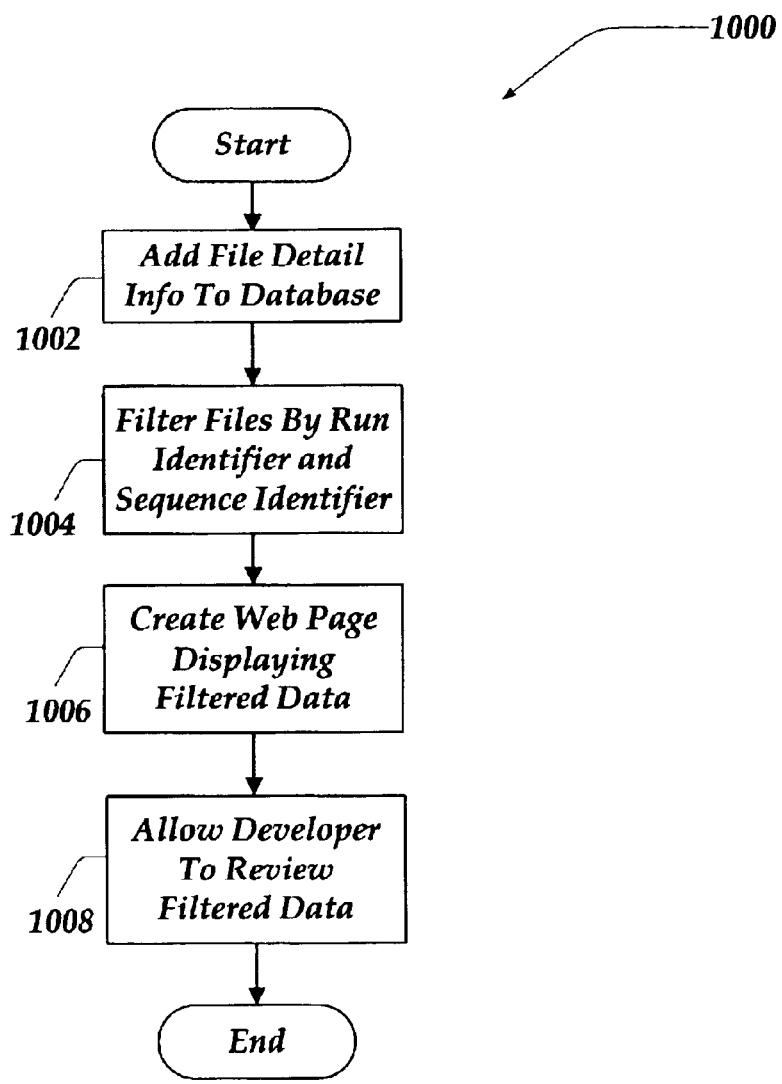
FIG. 10 is a logical flow diagram illustrating an overview of a database management and interface process in accordance with the present invention.

FIG. 10 is a logical flow diagram illustrating an overview of a database management and interface process in accordance with the present invention. The process 1000 begins at a start block after at least one log file has been transported to server 130 shown in FIG. 1. Processing continues at block 1002.

At block 1002, file detail information (e.g., user, date, time to failure, log file path, etc.) that may have been included in the log files is added to a central database by database manager application 132 shown in FIG. 1. The detail information assists in recreating the instances of errors or gathering usage information from the user's mobile device. Once the detail information has been added to the database, processing proceeds to block 1004.

At block 1004, the log files are filtered according to their sequence identifier 440 and run identifier 460 described in greater detail in connection with FIG. 4. The Run identifier and Sequence identifier assist in allowing a developer to recreate a call stack that was present at the time an error or other event of interest occurred on the mobile device. After the log files are filtered according to their sequence identifier run identifier, processing advances to block 1006.

At block 1006, a web page is created by database interface application 134 shown in FIG. 1. The web page displays the filtered data in a manner sufficient to allow a developer to analyze an error or usage patterns that occurred on a mobile device in a disconnected mode. The web page can include detailed information or interpreted information that assists in debugging and tracking usage patterns on mobile devices. Once the web page is generated, processing continues at block 1008.

At block 1008, a developer or user accesses the web page to review the aggregated data in a disconnected mode. In one embodiment, if the user determines that the error constitutes a bug, the error and user data of the log files corresponding to that error are entered into a database for future reference. In another embodiment, when a user selects to get a call stack, the log files are automatically concatenated into one file and processed to generate a complete call stack for the failure. The user is then able to review the call stack that was on the mobile device for the time interval of interest. Once the user is able to access the web page information, the process moves to an end block where the server moves on to perform other functions.

In an alternative embodiment, the log files may be "piggy-backed" onto the synchronization of e-mail as the primary delivery mechanism between the mobile device and the server. Transporting the log files via e-mail allows the log files to be transported directly to the server for certain mobile devices (e.g., e-mail pager). In this implementation, the data stream on the device is parceled into discrete packages and placed into an e-mail message targeted at the server. When the mobile device is synchronized with an exchange server, such outgoing e-mail is synchronized and subsequently delivered to the server. The server has an e-mail address specifically set up for this purpose. E-mail coming into this address is processed by extracting the data of interest, and delivering it into a central database as described above.

In another embodiment, access to the calling conventions for the processor of the mobile device may need to be accessed, as well as the method in which the operating system uses the calling convention.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer program product comprises a computer usable medium having computer readable program code embodied on said medium for a log file from an application program module, comprising:
   a first data field containing data representing usage patterns of a mobile device;
   a second data field containing data representing the occurrence of an error on the mobile device;
   a third data field containing a sequence identifier that identifies the log file with a specified interval of time;
   a fourth data filed containing a size label that identifies the size of the log file;
   a fifth data field containing a run identifier that identifies the log file as a log file generated during an interval of time between a first reset of the mobile device and a second reset of the mobile device; and
   a sixth data field containing a typo identifier that identifies the log file as contain error data when an error has occurred on the mobile device.

2. The computer program product of claim 1, wherein the first data field contains at least one of keystroke entries, stylus entries, button press entries, and keyed entries made on the mobile device by a user.

3. The computer program product of claim 1, wherein the second data field contains data sufficient to recreate, in a disconnected mode, the state existing on the mobile device at the time die error occurred.

4. A method for storing and transporting data representing usage patterns and error occurrences on a mobile device from the mobile device, comprising:
   receiving data by monitoring user interface entries and error occurrences of the mobile device;
   parceling the data as a sequence of log files;
   temporarily storing the log files on the mobile device;
   transporting each log file to one of a server and a user computer when a connection is established to the mobile device;
   deleting the successfully transported files from the mobile device;
   incorporating a sequence identifier into each log file such that each log file is identified according to a specified interval of time corresponding to operation of the mobile device; and
   incorporating a run identifier into each log file such that each log file is identified as being generated during an interval of time between a first reset of the mobile device and a second reset of the mobile device.

5. The method of claim 4, further comprising filtering the log files according to their sequence identifier and run identifier in a disconnected mode.

* * * * *